United States Patent Office 3,798,328
Patented Mar. 19, 1974

3,798,328
PROPIOLIC ACID ESTERS AS INDUSTRIAL MICROBICIDES
Akira Fujinami, Ashiya, Masaaki Hosomi, Amagasaki, Toshikazu Minami, Osaka, and Jasakazu Asai, Kyoto, Japan, assignors to Sumitomo Chemical Company, Limited, Osaka, Japan
No Drawing. Filed Apr. 13, 1971, Ser. No. 133,745
Claims priority, application Japan, Apr. 15, 1970, 45/32,556
Int. Cl. A01n 9/00, 9/24
U.S. Cl. 424—314     5 Claims

ABSTRACT OF THE DISCLOSURE

Propiolic acid ester having the formula, $$HC\equiv C\overset{O}{\underset{\|}{C}}O-R$$

wherein R is a cyclohexyl group or a group of the formula —$CH_2$—R′ where R′ is a lower aralkyl group, a saturated or unsaturated phthalimide group, or a group of the formula

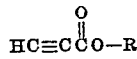

where X is a halogen atom, a nitro group, a lower alkyl group or a lower alkoxy group, and $n$ is an integer of 1 to 5 is strong in microbicidal activity. Particularly, it is extremely high in biological activity against molds, low in toxicity and high in workability, and hence is quite useful as an industrial microbicide.

---

This invention relates to novel propiolic acid esters and novel industrial microbicides containing said esters as active ingredients.

Heretofore, organomercury, organotin, chlorinated phenol and organosulfur compounds have been used as industrial microbicides in various fields. These compounds, however, have not been satisfactory in toxicity, workability and effectiveness.

An object of the present invention is to provide novel propiolic acid esters.

Another object of the invention is to provide novel industrial microbicides.

A further object of the invention is to provide novel industrial microbicides which are low in toxicity, high in workability and prominent in activity against microorganisms.

Other objects and advantages of the present invention will become apparent from the following description.

In accordance with the present invention, there are provided novel propiolic acid esters having the formula, $$HC\equiv C\overset{O}{\underset{\|}{C}}O-R$$

wherein R is a cyclohexyl group or a group of the formula —$CH_2$R′ where R′ is a lower aralkyl group, a saturated or unsaturated phthalimide group or a group of the formula

where X is a halogen atom, a nitro group, a lower alkyl group or a lower alkoxy group, and $n$ is an integer of 1 to 5.

The present invention further provides novel industrial microbicides containing at least one of the above-mentioned propiolic acid esters as an active ingredient.

The propiolic acid esters of the present invention are markedly effective for the prevention and conquer of drawbacks brought about by microorganisms, and application fields thereof are general industrial fields excluding medical and agricultural fields. That is, the propiolic acid esters of the present invention are useful for use to prevent and overcome various drawbacks brought about by the growth of undesirable microorganisms such as bacteria and molds at the time of production, storage, transportation and use of industrial materials and products.

Concrete examples of such drawbacks are as follows:

1. Drawback of slime formation in paper-making steps and industrial cooling water systems which is chiefly brought about in the case where bacteria and molds have grown during such steps.
2. Drawback of contamination and strength deterioration which is brought about in the case where molds have grown in wet pulp.
3. Drawback of degradation in quality and decrease in yield of paper-making chips which is brought about in the case where molds have grown in the chips during storage or transportation.
4. Drawback of contamination of paints such as oil paints, water paints, varnishes, etc. which is brought about in the case where molds have grown on films formed by solidification of the paints.
5. Drawback of degradation in quality of synthetic resin emulsions or emulsion paints which is brought about in the case where bacteria and molds have grown in said emulsions or paints.
6. Drawback of contamination and degradation in strength of materials, products and processed articles made from natural fibers, synthetic fibers and mixtures thereof which is brought about in the case where chiefly molds, and occasionally bacteria, have grown in said materials, products and processed articles.
7. Drawback of degradation in quality of adhesives or pastes composed of casein, starches or the like which is brought about in the case where bacteria and molds have grown in said adhesives or pastes.
8. Drawback of contamination of papers or films composed of celluloses, polyvinyl alcohols and synthetic resins which is brought about in the case where molds have grown in said papers or films.
9. Drawback of contamination of natural rubber products or synthetic resin molded articles which is brought about in the case where molds have grown in said products or articles.
10. Drawback of contamination of processed articles of such natural materials as leather and bamboo which is brought about in the case where molds have grown in said articles.

The propiolic acid esters of the present invention contain no poisonous heavy metals at all, and are not only excellent in low toxicity and workability but also prominent in microbicidal activity as compared with the microbicidal compounds of the prior art. Particularly, they are extremely high in activity against molds.

The propiolic acid esters of the present invention can be prepared in high yields by heating with stirring an alcohol represented by the formula,

R—OH wherein R is as defined previously, together with propiolic acid, preferably in an inert solvent, and, if necessary, in the presence of a suitable catalyst such as, for example, hydrochloric, sulfuric or p-toluene-sulfonic acid or a derivative thereof. Examples of the said alcohol include cyclohexanol, 2-chlorobenzyl alcohol, 3-chlorobenzyl alcohol, 4 - chlorobenzyl alcohol, 2,4 - dichlorobenzyl alcohol, 3,4-dichlorobenzyl alcohol, 3,5-dichlorobenzyl alcohol, 2,3,6-trichlorobenzyl alcohol, 2,4,6-trichlorobenzyl alcohol, 2,4,5-trichlorobenzyl alcohol, 2,3,5,6-tetrachlorobenzyl alcohol, 2,3,4,5,6-pentachlorobenzyl alcohol, 2-methylbenzyl alcohol, 3-methylbenzyl alcohol, 4-methylbenzyl alcohol, 3,4-dimethybenzyl alcohol, 2,4-dimethylbenzyl alcohol, 2,3,5-trimethylbenzyl alcohol, 2,3,5,6-tetramethylbenzyl alcohol, 4-methoxybenzyl alcohol, 4-nitrobenzyl alcohol, 3-nitrobenzyl alcohol, phthalimidomethyl alcohol, tetrahydrophthalimidomethyl alcohol, and phenylethyl alcohol.

Typical propiolic acid esters of the present invention are exemplified in Table 1, in which are also shown, in order to concretely indicate the fact that these compounds have prominent activities against microorganisms, complete growth-inhibiting concentrations in test tubes of said compounds against the typical mold *Aspergillus niger*.

TABLE 1

| Compound number | Chemical structure | Mold-inhibiting concentration (p.p.m.) |
|---|---|---|
| (1) | HC≡CCO—C₆H₅ | <5 |
| (2) | HC≡CCOCH₂—C₆H₄—Cl (2-Cl) | 10–25 |
| (3) | HC≡CCOCH₂—C₆H₄—Cl (4-Cl) | <5 |
| (4) | HC≡CCOCH₂—C₆H₃—Cl₂ (2,4-Cl₂) | 10–25 |
| (5) | HC≡CCOCH₂—C₆H₃—Cl₂ (2,5-Cl₂) | 10–25 |
| (6) | HC≡CCOCH₂—C₆H₃—Cl₂ (2,6-Cl₂) | 10–25 |
| (7) | HC≡CCOCH₂—C₆H₂—Cl₃ | 10–25 |
| (8) | HC≡CCOCH₂—C₆H₄—CH₃ | 5–10 |
| (9) | HC≡CCOCH₂—C₆H₄—CH₃ (o-) | <5 |
| (10) | HC≡CCOCH₂—C₆H₃(CH₃)₂ | 10–25 |
| (11) | HC≡CCOCH₂—C₆H₄—NO₂ | 10–25 |
| (12) | HC≡CCOCH₂—C₆H₄—NO₂ | 25–50 |
| (13) | HC≡CCOCH₂—CH₂—C₆H₅ | 5–10 |
| (14) | HC≡CCOCH₂—N(phthalimide) | 50–75 |
| (15) | HC≡CCOCH₂—N(tetrahydrophthalimide) | 75–100 |
| (16) | HC≡CCOCH₂—C₆H₄—Cl | 5 |
| (17) | HC≡CCOCH₂—C₆H₃—Cl₂ | |

NOTE: The symbol "<5" shows that the compound was effective at a concentration of 5 p.p.m. and was not tested at concentrations lower than said value.

In actual application, the present compounds may be used in pure forms without addition of other ingredients. Alternatively, they may be applied, for easier application as microbicidal chemicals, in the form of emulsions, solutions or dispersions by using them in admixture with a suitable carrier, by dissolving them in an oleophilic or hydrophilic solvent or by emulsifying or dispersing them with an emulsifier. Furthermore, they may, of course, be formulated into any of wettable powders, granules, dusts, aerosols, etc., in addition to said forms, and may be used in admixture with other chemicals. That is, it is not objectionable at all to use, if necessary, the present compounds in admixture with other industrial microbicides, e.g., halogenated phenols such as trichlorophenol, pentachlorophenol, dichlorophene and hexachlorophene, bisphenol compounds, organic compounds such as tributyltin oxide and tributyltin oleate, organosulfur compounds such as dimethyl dithiocarbamate and methylenebisthiocyanate, salicylanilides, brominated salicyl anilides, or quaternary ammonium derivatives such as alkyldimethyl benzylammonium chloride and the like.

The present invention is illustrated in further detail below with reference to examples, but it is needless to say that the kinds and mixing proportions of compounds and additives are variable within wide scopes without being limited to those set forth in the examples. In the examples, the names of the present compounds are represented by the numbers of the compounds exemplified previously, and all parts and percentages are by weight.

EXAMPLES 1–6

A solution of a mixture comprising 1.0 mole of 2-chlorobenzyl alcohol and 1.0 mole of propiolic acid in 10 times the amount of said mixture of benzene was mixed with 5 g. of p-toluenesulfonic acid, and the resulting mixture was stirred under reflux for 6 hours. After completion of the reaction, the reaction mixture was washed with a 5% aqueous caustic soda solution and washed with water to neutral pH, and then the benzene was removed by distillation to obtain 2-chlorobenzyl propiolate.

The above operations were repeated, except that the 2-chlorobenzyl alcohol was replaced by other alcohols, to obtain such results as set forth in Table 2.

TABLE 2

| Example No. | Benzyl alcohol used | Structural formula | Compound number | Physical constant | Yield, percent | Calculated C | Calculated H | Calculated Cl | Found C | Found H | Found Cl |
|---|---|---|---|---|---|---|---|---|---|---|---|
| 1 | 2-chlorobenzyl alcohol | HC≡CCOOCH₂-C₆H₄-Cl | (2) | B.P., 0.03 (74–76° C.) $n_{D18}$ 1.5444 | 97 | 61.72 | 3.63 | 18.22 | 61.55 | 3.64 | 18.02 |
| 2 | 4-chlorobenzyl alcohol | HC≡CCOOCH₂-C₆H₄-Cl | (3) | B.P., 0.15 (74–76° C.) $n_{D19}$ 1.5549 | 96 | 61.72 | 3.63 | 18.22 | 61.54 | 3.22 | 18.16 |
| 3 | 3,4-dichlorobenzyl alcohol | HC≡CCOOCH₂-C₆H₃-Cl₂ | (5) | B.P., 0.08 (94–98° C.) $n_{D18}$ 1.5553 | 98 | 52.44 | 2.64 | 30.96 | 52.47 | 2.79 | 30.77 |
| 4 | 2,3,6-trichlorobenzyl alcohol | HC≡CCOOCH₂-C₆H₂-Cl₃ | (7) | M.P., 52–54° C. | 97 | 45.58 | 1.91 | 40.36 | 45.38 | 1.70 | 40.61 |
| 5 | 2,3,4,5,6-pentachlorobenzyl alcohol | HC≡CCOOCH₂-C₆Cl₅ | (8) | M.P., 138° C. | 98 | 36.13 | 0.91 | 53.33 | 36.25 | 0.79 | 53.47 |
| 6 | 3-methylbenzyl alcohol | HC≡CCOOCH₂-C₆H₄-CH₃ | (9) | B.P., 0.15 (76–80° C.) $n_{D18.5}$ 1.5248 | 96 | 75.84 | 5.79 | — | 75.62 | 5.88 | — |

EXAMPLE 7

Emulsifiable concentrate

Each of the exemplified Compounds 3 and 9 was mixed with 60 parts of xylene and 20 parts of an emulsifier (polyoxyethylene alkylphenol type) to obtain an emulsifiable concentrate containing 20% of active ingredient.

For comparison pentachlorophenol (PCP), which has heretofore been used as a microbicidal compound, was treated in the same manner as above to prepare another emulsifiable concentrate.

Each of the thus prepared emulsifiable concentrates was subjected to microbicidal test carried out according to a continuous dilution method using a wort culture medium (culturing at 28°±2° C. for 5 days) to measure the minimum concentration thereof for complete growth inhibition of strains regulated in the microbicidal test method of JIS Z 2911. The results obtained were as set forth in Table 3.

TABLE 3

| Active ingredient | Biological activity—Minimum concentration for complete growth inhibition (p.p.m.) | | |
|---|---|---|---|
| | Present compound (3) | Present compound (9) | Control P.C.P. |
| Test microorganism: | | | |
| Asperigillus flavus | 5.0–10.0 | 1.0–5.0 | 25.0–50.0 |
| Aspergillus niger | 1.0–5.0 | 5.0–10.0 | 50.0–75.0 |
| Aspergillus terreus | 1.0–5.0 | 5.0–10.0 | 50.0–75.0 |
| Aspergillus fumigatus | 5.0–10.0 | 5.0–10.0 | 50.0–75.0 |
| Cladosporium herbarum | 1.0–5.0 | 5.0–10.0 | 25.0–55.0 |
| Penicillium cutrinum | 15.0–20.0 | 15.0–20.0 | 50.0–75.0 |
| Rhizopus nigricans | 10.0–15.0 | 10.0–15.0 | 75.0–100.0 |
| Chaetomium globosum | 15.0–20.0 | 15.0–20.0 | 25.0–50.0 |
| Myrothecium verrucaria | 10.0–15.0 | 10.0–15.0 | 25.0–50.0 |

EXAMPLE 8

Wettable powder 10 parts of the Compound 5, 2 parts of a wetting agent (alkylbenzenesulfonate type) and 88 parts of diatomaceous earth were sufficiently pulverized and mixed together to obtain a wettable powder containing 10% of active ingredient. In application, the wettable powder was diluted with water, and the resulting dilution was sprayed.

EXAMPLE 9

Oil spray 30 parts of the Compound 9, 20 parts of ethyl acetate and 50 parts of xylene were sufficiently mixed together to obtain a pale yellow transparent solution. This solution was an oil spray containing 30% of active ingredient.

EXAMPLE 10

Water-soluble concentrate 10 parts of the Compound 3, 80 parts of diethylene glycol monomethyl ether and 10 parts of a soluble dispersant (polyoxyethylene alkyl ether type) were sufficiently mixed together to obtain a water-soluble concentrate containing 10% of active ingredient. This concentrate could be diluted with water.

In order to substantiate excellent controlling effects of the present compounds, typical applications are set forth below.

EXAMPLE 11

Application to wood pulp chips

Chips obtained by finely dividing waste rubber wood, mangrove wood and eucalyptus wood, which occur in the Southern regions, are less in lignin content than pine wood and Japanese cypress, and hence are liable to be contaminated with molds. Further, when these chips are contaminated with molds, they are degraded in quality due to discoloration or decomposition of cellulose components to bring about decrease in yields of resulting pulp. In addition, the contaminated chips are difficultly dispersible at the time of air transportation to bring about lowering of transportation efficiency. In order to overcome such drawbacks, pentachlorophenol which is relatively excellent in microbicidal effect has come to be put into practical use. However, the present inventors made microbicidal effectiveness tests on the wettable powder obtained according to Example 8 in comparison with pentachlorophenol to confirm that the present compound is more effective than pentachlorophenol. The tests were carried out in such a manner that Southern occurrence wood chips were treated with each of the wettable powder obtained according to Example 8 and pentachlorophenol, which had been formulated into a wettable powder containing the same amount of active ingredient as that of the present wettable powder, and then allowed to stand for 4 weeks under such conditions as 28°±2° C. and 96% RH. As the result, it was found that in the case of chips treated with 0.05% of the wettable powder containing 10% of pentachlorophenol, the growth of molds was observed in substantially the same degree as that observed in non-treated control chips, whereas the wettable powder of Example 8 could completely inhibit the growth of molds even when it was used in an amount of 0.025%.

EXAMPLE 12

Application to paints

The oil spray of Example 9 and a control oil spray containing 30% of microbicidal phenylmercury acetate for paint which is high in toxicity but is the most excellent in microbicidal effect were individually applied to phthalic acid resin paints and tested in microbicidal effect according to the method of JIS Z 2911. As the result, a paint incorporated with 0.3% of the oil spray of Example 9 showed the microbicidal grade "3," i.e. displayed such effect that no growth of molds was observed in the paint or in portions of a substrate to which the paint had been applied, whereas in the case of a paint incorporated with 0.3% of the phenylmercury acetate oil spray, the growth of molds was observed, and the area in which the molds had grown was the grade "2," i.e. not exceeding ⅓ of the whole area.

EXAMPLE 13

Application to paper-making steps

Molds, chiefly *Oospora lactis*, had grown in steps for making 120 tons per day of kraft papers, with the result that large quantities of slimes were formed in the stock inlet, wire parts and white water tank to make 2 weeks continuous operation difficult. That is, accumulated slimes had released and flowed out, so that spots were formed in the product papers to degrade the quality thereof and, on the other hand, the papers were irregularly cut due to the slime to greatly injure the productivity. To the paper-making steps under such conditions as above, the water-soluble concentrate obtained according to Example 10 was continuously added so that 10 p.p.m. of the concentrate could always be maintained in both of the paper material preparation step and the white water recycle system, whereby no injury due to slimes was observed at all and no difficulty was encountered in the 2 weeks continuous operation. That is, even after the 2 weeks continuous operation, no substantial slimes were formed at portion where large quantities of slimes had been formed, so that the resulting papers were neither cut nor degraded in quality due to formation of slimes.

Thereafter, the said water-soluble concentrate was not added continuously but adjusted intermittently to 10 p.p.m. every 24 hours in order to increase the economy. Even in this case, it was confirmed that no practical drawbacks were brought about.

EXAMPLE 14

Application to sizes

One platinum loop of *Aspergillus niger* spore was inoculated in an adhesive size comprising 5 parts of corn starch incorporated with 0.05% of the Compound 11, 2 parts of polyvinyl alcohol, 0.02 part of caustic soda and 97 parts of water, and was cultured for 60 days under the conditions of 28°±2° C. and 96% RH, but no change was observed in the paste. On the other hand, a size prepared in the same manner as above, except that the corn starch had not been incorporated with the present compound, was brought to such a state that the growth of the test microorganism was observed on the 4th day after initiation of the culture, and large amounts of molds were formed over the entire surface on the 9th day.

What is claimed is:

1. A method of combatting bacteria or fungi, which comprises exposing said bacteria or fungi to a bactericidally or a fungicidally effective amount of a compound having the formula,

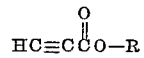

wherein R is a member selected from the group consisting of cyclohexyl, phenethyl and

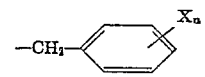

in which X is a member selected from the group consisting of chlorine, nitro and methyl, and *n* is an integer of 1 to 5 when X is chlorine, *n* is 1 when X is nitro and *n* is 1 to 4 when X is methyl.

2. The method according to claim 1, wherein R is cyclohexyl.

3. The method according to claim 1, wherein R is phenethyl.

4. The method according to claim 1, wherein R is a member selected from the group consisting of 2-chlorobenzyl, 3 - chlorobenzyl, 4 - chlorobenzyl, 2,4 - dichlorobenzyl, 3,4-dichlorobenzyl, 3-methylbenzyl and 3-nitrobenzyl.

5. A microbicidal process to prevent the growth of bacteria or fungi comprising applying a bactericidally or a fungicidally effective amount of a propiolic acid ester having the formula

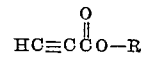

wherein R is a member selected from the group consisting of cyclohexyl, phenethyl and

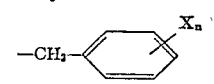

in which X is a member selected from the group consisting of chlorine, nitro and methyl, and *n* is an integer of 1 to 5 when X is chlorine, *n* is 1 when X is nitro and *n* is 1 to 4 when X is methyl to any of wood chips, phthalic acid resin paint, kraft papers or adhesive sizes.

References Cited

UNITED STATES PATENTS

| | | | |
|---|---|---|---|
| 3,097,230 | 7/1963 | Miller | 424—314 |
| 3,156,612 | 11/1964 | Butler et al. | 424—314 X |
| 3,210,405 | 10/1965 | Miller | 424—314 X |

OTHER REFERENCES

Bowie et al., Tetrahedron 23(1), 305–20 (1967).

ALBERT T. MEYERS, Primary Examiner
A. J. ROBINSON, Assistant Examiner

U.S. Cl. X.R.

117—148, 155; 162—161; 260—17.4, 29.2 E; 424—274